(12) United States Patent
Shi et al.

(10) Patent No.: US 12,174,017 B2
(45) Date of Patent: Dec. 24, 2024

(54) COMPOSITE MEASUREMENT SYSTEM FOR MEASURING NANOMETER DISPLACEMENT

(71) Applicant: National Institute of Metrology, China, Beijing (CN)

(72) Inventors: Yushu Shi, Beijing (CN); Shu Zhang, Beijing (CN); Fang Wang, Beijing (CN); Lei Pi, Beijing (CN); Xiangpeng Bu, Beijing (CN)

(73) Assignee: National Institute of Metrology, China (CN)

( * ) Notice: Subject to any disclaimer, the term of this patent is extended or adjusted under 35 U.S.C. 154(b) by 192 days.

(21) Appl. No.: 17/834,763

(22) Filed: Jun. 7, 2022

(65) Prior Publication Data

US 2022/0412719 A1    Dec. 29, 2022

(30) Foreign Application Priority Data

Jun. 28, 2021    (CN) .......................... 202110721179.X
Jun. 28, 2021    (CN) .......................... 202110723170.2

(51) Int. Cl.
*G01B 9/02017*    (2022.01)
*G01B 9/02001*    (2022.01)
*G01B 9/02015*    (2022.01)

(52) U.S. Cl.
CPC ..... *G01B 9/02019* (2013.01); *G01B 9/02007* (2013.01); *G01B 9/02017* (2013.01); *G01B 9/02028* (2013.01); *G01B 2290/70* (2013.01)

(58) Field of Classification Search
CPC ............ G01B 9/02018; G01B 9/02019; G01B 9/02028; G01B 2290/70
See application file for complete search history.

(56) References Cited

U.S. PATENT DOCUMENTS

| 6,882,430 | B2* | 4/2005 | Hill | .................... | G01B 9/02019 356/490 |
| 2004/0150831 | A1* | 8/2004 | Ray | .................... | G01B 9/02027 356/493 |
| 2017/0167849 | A1* | 6/2017 | Feng | .................. | G01B 9/02029 |
| 2020/0386533 | A1* | 12/2020 | Hu | ..................... | G01B 9/02007 |

FOREIGN PATENT DOCUMENTS

| WO | WO-2011061514 A1 * | 5/2011 | ............. G01B 11/26 |
| WO | WO-2019062466 A1 * | 4/2019 | ........... G01B 9/0201 |

* cited by examiner

*Primary Examiner* — Michael A Lyons
(74) *Attorney, Agent, or Firm* — Dickinson Wright PLLC

(57) ABSTRACT

A composite measurement system for measuring nanometer displacement is provided. The system includes: a light source, a polarization beam splitting prism, a first phase change module, a second phase change module, a first right-angle prism, a second right-angle prism, a non-polarization beam splitting prism, a scalar interference light collection module, a vector interference light collection module and a displacement calculation module. In the present disclosure, a photodetector is configured to collect an intensity of scalar interference light of the object to be measured being moved, to obtain a periodic light intensity change curve; a CCD camera is configured to collect images of interference vortex light of the object being moved; and the displacement calculation unit is configured to calculate a displacement of the object according to integer periods of the light intensity change curve and angles of image changes of the interference vortex light.

15 Claims, 1 Drawing Sheet

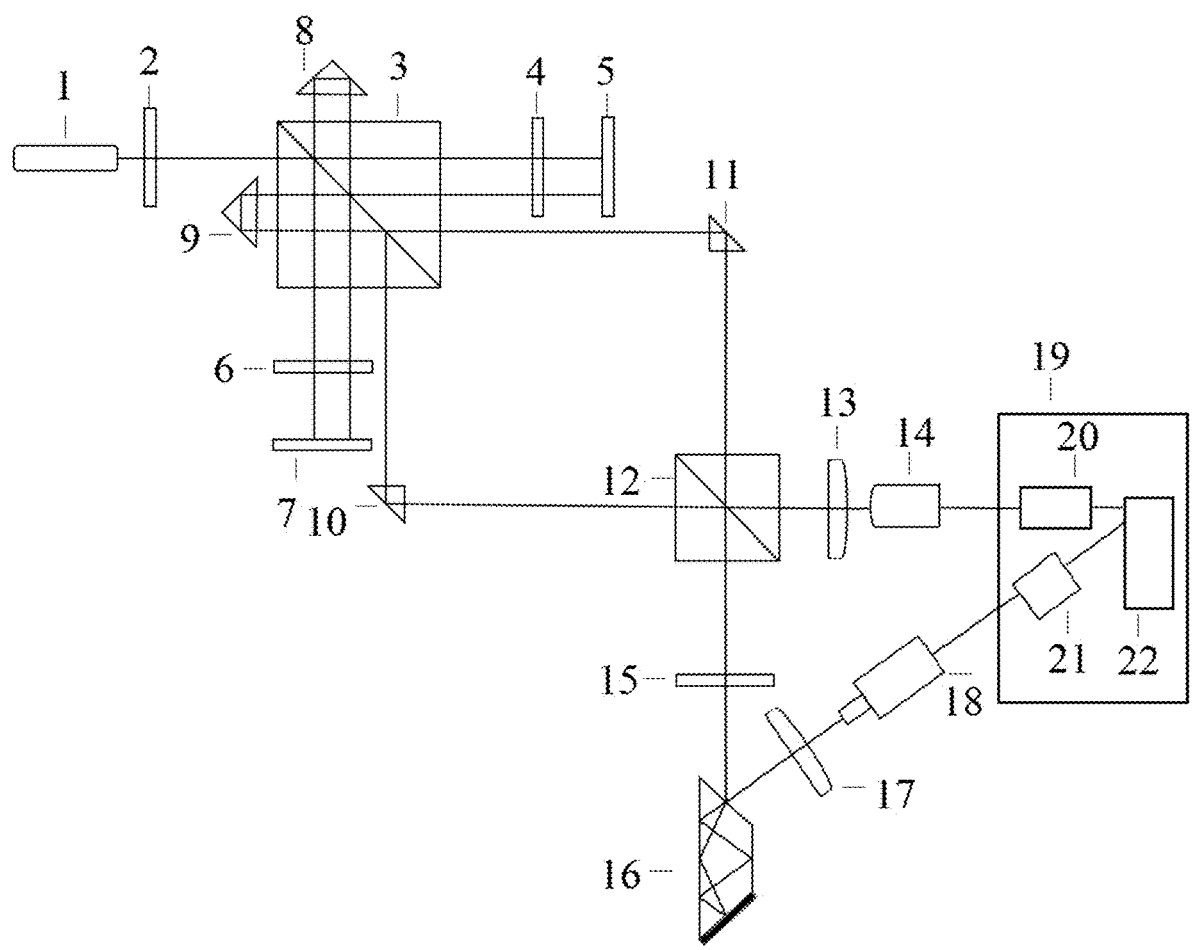

COMPOSITE MEASUREMENT SYSTEM FOR MEASURING NANOMETER DISPLACEMENT

CROSS REFERENCE TO RELATED APPLICATIONS

This patent application claims the benefit and priority of Chinese Patent Application No. 202110723170.2 filed on Jun. 28, 2021 and No. 202110721179.X filed on Jun. 28, 2021, the disclosure of which are incorporated by reference herein in their entireties.

TECHNICAL FIELD

The present disclosure relates to a composite measurement system for measuring nanometer displacement, and in particular, to a dual interference measurement system for measuring nanometer displacement based on vortex and scalar light field.

BACKGROUND ART

Currently, laser interference principle-based nanometer displacement measurement technology is the most commonly used nanometer displacement measurement method. After experimenting with Michelson interferometer for a first time, the interferometer has developed rapidly and is widely applied in measurement fields such as length, angle and micro-topography. Most researches on interferometer-based displacement measurement focus on improvement of measurement resolution and stability.

Common scalar light field interference signal has obvious advantages of interface fringe's bright and dark boundary, but comparing with vortex interference signal, the common scalar light field interference signal has a shortcoming of lacking a reference for interference signal phase subdivision directly. A nanometer displacement measurement system based on the vector vortex light field interference uses higher subdivision multiple of original interference signal of the vector vortex light field to improve resolution of the nanometer displacement measurement. Interference fringe of the vector vortex light field is petal-shaped, and the interference fringe will rotate with change of the displacement, so the vector vortex light field has a natural reference of 360° compared with conventional vector light field. However, at the same time, the number of interference fringes in the vector vortex light field is more than that of the scalar light field, and signal acquisition and demodulation is more difficult.

At present, there is still a lack of an optics that uses both the vector vortex light field and the scalar light field in combination with the multi-octave light paths for nanometer displacement measurement, thereby effectively improving the measurement resolution of the interferometer and also realizing the rapid acquisition and demodulation of interference signals.

SUMMARY

An object of the embodiments is to provide a composite displacement measurement system based on interference signals and multi-octave light paths, which realizes rapid acquisition and demodulation of interference signals while improving the resolution of measurement.

To implement the above object, the present disclosure provides the following solutions.

A composite measurement system for measuring nanometer displacement, includes: a light source, a polarization beam splitting prism, a first phase change module, a second phase change module, a first right-angle prism, a second right-angle prism, a non-polarization beam splitting prism, a scalar interference light collection module, a vector interference light collection module and a displacement calculation module.

The light source is configured to emit laser beam.

The polarization beam splitting prism is arranged on an outgoing light path of the laser beam, and is configured to divide the laser beam into a first transmitted light and a first reflected light.

The first phase change module is arranged on an outgoing light path of the first transmitted light, an object to be measured is arranged in the first phase change module, and the first phase change module is configured to: change a phase of the first transmitted light, transmit the first transmitted light after phase change to the object, receive a first to-be-measured light reflected by the object, change a phase of the first to-be-measured light to obtain a second reflected light, and transmit the second reflected light to the polarization beam splitting prism.

The second phase change module is arranged on an outgoing light path of the first reflected light, and is configured to: change a phase and direction of the first reflected light to obtain a second transmitted light, and transmit the second transmitted light to the polarization beam splitting prism.

The polarization beam splitting prism is also configured to converge the second reflected light and the second transmitted light to obtain a first convergent light.

The first right-angle prism is arranged on an outgoing light path of the first convergent light, and is configured to reverse a direction of the first convergent light to obtain a first reversed light.

The polarization beam splitting prism is also configured to divide the first reversed light into a third transmitted light and a third reflected light.

The first phase change module is also configured to: change a phase of the third reflected light, transmit the third reflected light after phase change to the object, receive a second to-be-measured light reflected by the object, change a phase of the second to-be-measured light to obtain a fourth transmitted light, and transmit the fourth transmitted light to the polarization beam splitting prism.

The second phase change module is also configured to: change a phase and direction of the third transmitted light to obtain a fourth reflected light, and transmit the fourth reflected light to the polarization beam splitting prism.

The polarization beam splitting prism is also configured to converge the fourth transmitted light and the fourth reflected light to obtain a second convergent light.

The second right-angle prism is arranged on an outgoing light path of the second convergent light, and is configured to reverse a direction of the second convergent light to obtain a second reversed light.

The polarization beam splitting prism is also configured to divide the second reversed light into a fifth transmitted light and a fifth reflected light.

The non-polarization beam splitting prism is configured to converge the fifth transmitted light and the fifth reflected light to obtain a scalar interference light and a vector interference light.

The scalar interference light collection module is arranged on an outgoing light path of the scalar interference light, and is configured to collect the scalar interference light.

The vector interference light collection module is arranged on an outgoing light path of the vector interference light, and is configured to: collect the vector interference light, perform a vortex interference on the vector interference light to obtain an interference vortex light, and collect the interference vortex light.

The displacement calculation module is connected to the scalar interference light collection module and the vector interference light collection module respectively, and the displacement calculation module is configured to calculate a displacement of the object being moved according to the scalar interference light and the interference vortex light.

In some embodiments, the system further includes: a third right-angle prism. The third right-angle prism is arranged on an outgoing light path of the fifth reflected light, and is configured to change a direction of the fifth reflected light and transmit the fifth reflected light after direction change to the non-polarization beam splitting prism.

In some embodiments, the system further includes: a fourth right-angle prism. The fourth right-angle prism is arranged on an outgoing light path of the fifth transmitted light, and is configured to change a direction of the fifth transmitted light and transmit the fifth reflected light after direction change to the non-polarization beam splitting prism.

In some embodiments, the first phase change module includes a first quarter wave plate. The first quarter wave plate is arranged on the outgoing light path of the first transmitted light, and is located between the polarization beam splitting prism and the object; the first quarter wave plate is configured to change a phase of a light passing through the first quarter wave plate.

In some embodiments, the first phase change module further includes a first plane mirror. The first plane mirror is arranged on an outgoing light path of the light after phase change, and is located on surface of the object; the first plane mirror is configured to reflect the light after phase change which has arrived at the first plane mirror, to the first quarter wave plate.

In some embodiments, the second phase change module includes a second quarter wave plate and a second plane mirror. The second quarter wave plate and the second plane mirror are arranged on the outgoing light path of the first reflected light, and the second quarter wave plate is located between the polarization beam splitting prism and the second plane mirror. The second quarter wave plate is configured to change a phase of a light passing through the second quarter wave plate. The second plane mirror is configured to reflect the light after phase change which has arrived at the second plane mirror, to the second quarter wave plate.

In some embodiments, the system further includes a third quarter wave plate. The third quarter wave plate is arranged on the outgoing light path of the laser beam, and is located between the light source and the polarization beam splitting prism; the third quarter wave plate is configured to translate the laser beam into a circular polarized light, and transmit the circular polarized light to the polarization beam splitting prism.

In some embodiments, the scalar interference light collection module includes a photodetector. The photodetector is arranged on the outgoing light path of the scalar interference light, and is configured to collect the scalar interference light.

In some embodiments, the scalar interference light collection module further includes a first laser beam expander. The first laser beam expander is arranged on the outgoing light path of the scalar interference light, and is located between the photodetector and the non-polarization beam splitting prism. The first laser beam expander is configured to amplify the scalar interference light, and transmit the scalar interference light amplified to the photodetector.

In some embodiments, the vector interference light collection module includes an interference vortex light generating unit and an interference vortex light collection unit. The interference vortex light generating unit is arranged on the outgoing light path of the vector interference light and is configured to receive the vector interference light and perform the vortex interference on the vector interference light to obtain the interference vortex light. The interference vortex light collection unit is connected to the interference vortex light generating unit, and is configured to collect the interference vortex light.

In some embodiments, the interference vortex light generating unit includes a vortex half-wave plate and a Dove prism. The vortex half-wave plate is arranged on the outgoing light path of the vector interference light, and is configured to modulate the vector interference light into vortex light. The Dove prism is configured to: receive the vortex light, divide the vortex light into a reflected light and a refracted light, totally reflect the refracted light to obtain total reflected light, and perform interfere on the reflected light and the total reflected light to obtain the interference vortex light.

In some embodiments, the vector interference light collection unit includes a CCD camera. The CCD camera is configured to collect the interference vortex light.

In some embodiments, the interference vortex light collection unit further includes: a second laser beam expander. The second laser beam expander is arranged on the outgoing light path of the interference vortex light, and is configured to amplify the interference vortex light.

In some embodiments, the displacement calculation module includes: a first displacement calculation unit, a second displacement calculation unit and a third displacement calculation unit. The first displacement calculation unit is connected to the scalar interference light collection module, and is configured to calculate a first displacement of the object being moved according to the scalar interference light. The second displacement calculation unit is connected to the vector interference light collection module, and is configured to calculate a second displacement of the object being moved according to the interference vortex light. The third displacement calculation unit is connected to the first displacement calculation unit and the second displacement calculation unit, and the third displacement calculation unit is configured to calculate the displacement of the object according to the first displacement and the second displacement.

The embodiments have the following technical effects: the present disclosure provides the composite measurement system for measuring nanometer displacement, the system includes: a light source, a polarization beam splitting prism, a first phase change module, a second phase change module, a first right-angle prism, a second right-angle prism, a non-polarization beam splitting prism, a scalar interference light collection module, a vector interference light collection module, and a displacement calculation module. In the present disclosure, the photodetector is configured to collect an intensity of scalar interference light of the object to be measured being moved to obtain a periodic light intensity change curve; the CCD camera is configured to collect images of the interference vortex light of the object being moved; the displacement calculation module is configured to calculate the displacement of the object according to integer periods of the light intensity change curve and angles of image changes of the interference vortex light. In other words, the scalar interference light collected by the photodetector is a scalar signal, the interference vortex light collected by the CCD camera is a vector signal, the displacement of the object is calculated by combining the scalar signal with the vector signal, to realize rapid collection and demodulation of interference signals while improving the resolution of measuring the displacement.

BRIEF DESCRIPTION OF THE DRAWINGS

To describe the technical solutions in the embodiments of the present disclosure or in the prior art more clearly, the accompanying drawings required for the embodiments will be briefly described below. Apparently, the accompanying drawings described below are merely some embodiments of the present disclosure, and a common person skilled in the art may also obtain other accompanying drawings based on these accompanying drawings without creative efforts.

FIG. 1s a structural diagram of a composite measurement system for measuring nanometer displacement according to the present disclosure.

List of reference numerals: 1 a light source, 2 a third quarter wave plate, 3 a polarization beam splitting prism, 4 a first quarter wave plate, 5 a first plane mirror, 6 a second quarter wave plate, 7 a second plane mirror, 8 a first right-angle prism, 9 a second right-angle prism, 10 a third right-angle prism, 11 a fourth right-angle prism, 12 a non-polarization beam splitting prism, 13 a first laser beam expander, 14 a photodetector, 15 a vortex half-wave plate, 16 a Dove prism, 17 a second laser beam expander, 18 a CCD camera, 19 a displacement calculation module, 20 a first displacement calculation unit, 21 a second displacement calculation unit, and 22 a third displacement calculation unit.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All of other examples obtained by a person of ordinary skills in the art based on the examples of the present disclosure without creative efforts shall fall within the protection scope of the present disclosure.

The object of the present disclosure is to provide a composite measurement system for measuring nanometer displacement capable of realizing rapid acquisition and demodulation of interference signals while improving the resolution of measurement.

To make the above-mentioned objects, features, and advantages of the present disclosure clearer and more comprehensible, the present disclosure will be further described in detail below with reference to the accompanying drawings and specific implementation.

The FIG. 1s a structural diagram of a composite measurement system for measuring nanometer displacement according to the present disclosure. As shown in the FIGURE, the composite measurement system for measuring nanometer displacement includes: a light source 1, a polarization beam splitting prism 3, a first phase change module, a second phase change module, a first right-angle prism 8, a second right-angle prism 9, a non-polarization beam splitting prism 12, a scalar interference light collection module, a vector interference light collection module and a displacement calculation module 19.

The light source 1 is configured to emit laser beam.

The polarization beam splitting prism 3 is arranged on an outgoing light path of the laser beam, and is configured to divide the laser beam into a first transmitted light and a first reflected light.

The first phase change module is arranged on an outgoing light path of the first transmitted light, an object to be measured is arranged in the first phase change module, and the first phase change module is configured to: change a phase of the first transmitted light, transmit the first transmitted light after phase change to the object, receive a first to-be-measured light reflected by the object, change a phase of the first to-be-measured light to obtain a second reflected light, and transmit the second reflected light to the polarization beam splitting prism 3.

The second change module is arranged on an outgoing light path of the first reflected light, and is configured to: change a phase and direction of the first reflected light to obtain a second transmitted light, and transmit the second transmitted light to the polarization beam splitting prism 3.

The polarization beam splitting prism 3 is also configured to converge the second reflected light and the second transmitted light to obtain a first convergent light.

The first right-angle prism 8 is arranged on an outgoing light path of the first convergent light, and is configured to reverse a direction of the first convergent light to obtain a first reversed light.

The polarization beam splitting prism 3 is also configured to divide the first reversed light into a third transmitted light and a third reflected light.

The first phase change module is also configured to: change a phase of the third reflected light, transmit the third reflected light after phase change to the object, receive a second to-be-measured light reflected by the object, change a phase of the second to-be-measured light to obtain a fourth transmitted light, and transmit the fourth transmitted light to the polarization beam splitting prism 3.

The second phase change module is also configured to: change a phase and direction of the third transmitted light to obtain a fourth reflected light, and transmit the fourth reflected light to the polarization beam splitting prism 3.

The polarization beam splitting prism 3 is also configured to converge the fourth transmitted light and the fourth reflected light to obtain a second convergent light.

The second right-angle prism 9 is arranged on an outgoing light path of the second convergent light, and is configured to reverse a direction of the second convergent light to obtain a second reversed light.

The polarization beam splitting prism 3 is also configured to divide the second reversed light into a fifth transmitted light and a fifth reflected light.

The non-polarization beam splitting prism 12 is configured to converge the fifth transmitted light and the fifth reflected light to obtain a scalar interference light and a vector interference light.

The scalar interference light collection module is arranged on an outgoing light path of the scalar interference light, and is configured to collect the scalar interference light.

The vector interference light collection module is arranged on an outgoing light path of the vector interference light, and is configured to: collect the vector interference light, perform a vortex interference on the vector interference light to obtain an interference vortex light, and collect the interference vortex light.

The displacement calculation module 19 is connected to the scalar interference light collection module and the vector interference light collection module respectively, and the displacement calculation module 19 is configured to calculate a displacement of the object being moved according to the scalar interference light and the interference vortex light.

As an optional implementation, the system further includes: a third right-angle prism 10.

The third right-angle prism 10 is arranged on an outgoing light path of the fifth reflected light, and is configured to change a direction of the fifth reflected light and transmit the fifth reflected light after direction change to the non-polarization beam splitting prism 12.

Specifically, the third right-angle prism 10 allows the light paths to be neater and the arrangement of components of the system to be more perfect. Further, in the embodiments of the present disclosure, the third right-angle prism 10 rotates the path of the fifth reflected light by 90 degrees, However, the third right-angle prism 10 is not limited to above, but can be set according to the actual situation.

As an optional implementation, the system further includes: a fourth right-angle prism 11.

The fourth right-angle prism 11 is arranged on an outgoing light path of the fifth transmitted light, and is configured to change a direction of the fifth transmitted light and transmit the fifth reflected light after direction change to the non-polarization beam splitting prism 12.

Specifically, the fourth right-angle prism 11 allows the light paths to be neater, and the arrangement of components of the system to be more perfect. In the embodiments of the present disclosure, the fourth right-angle prism 11 rotates the light path of the fifth transmitted light by 90 degrees. However, the fourth right-angle prism 11 is not limited to above, but can be set according to the actual situation.

As an optional implementation, the first phase change module includes a first quarter wave plate 4.

The first quarter wave plate 4 is arranged on the outgoing light path of the first transmitted light, and is located between the polarization beam splitting prism 3 and the object. The first quarter wave plate 4 is configured to change a phase of a light passing through the first quarter wave plate 4.

As an optional implementation, the first phase change module further includes a first plane mirror 5.

The first plane mirror 5 is arranged on an outgoing light path of the light after phase change, and is located on surface of the object. The first plane mirror 5 is configured to reflect the light after phase change which has arrived at the first plane mirror 5, to the first quarter wave plate 4.

Specifically, through the first quarter wave plate 4, the phase of the light is changed by 90 degrees, a linear polarized light is changed into a circular polarized light through the first quarter wave plate 4, and the circular polarized light is changed into the linear polarized light.

As an optional implementation, the second phase change module includes a second quarter wave plate 6 and a second plane mirror 7.

The second quarter wave plate 6 and the second plane mirror 7 are arranged on the outgoing light path of the first reflected light, and the second quarter wave plate is located between the polarization beam splitting prism 3 and the second plane mirror 7.

The second quarter wave plate 6 is configured to change a phase of a light passing through the second quarter wave plate 6.

The second plane mirror 7 is configured to reflect the light after phase change which has arrived at the second plane mirror 7, to the second quarter wave plate 6.

Specifically, through the second quarter wave plate 6, the phase of the light is changed by 90 degrees, a linear polarized light is changed into a circular polarized light through the second quarter wave plate 6 and the circular polarized light is changed into the linear polarized light.

As an optional implementation, the system further includes a third quarter wave plate 2.

The third quarter wave plate 2 is arranged on the outgoing light path of the laser beam, and is located between the light source 1 and the polarization beam splitting prism 3. The third quarter wave plate 2 is configured to translate the laser beam into a circular polarized light, and transmit the circular polarized light to the polarization beam splitting prism 3.

As an optional implementation, the scalar interference light collection module includes a photodetector 14.

The photodetector 14 is arranged on the outgoing light path of the scalar interference light, and is configured to collect the scalar interference light.

Specifically, the photodetector 14 collects the light intensity of the scalar interference light during movement of the object, to generate the periodic light intensity change curve.

As an optional implementation, the scalar interference light collection module further includes a first laser beam expander 13.

The first laser beam expander 13 is arranged on the outgoing light path of the scalar interference light, and is located between the photodetector 14 and the non-polarization beam splitting prism 12.

The first laser beam expander 13 is configured to amplify the scalar interference light, and transmit the scalar interference light amplified to the photodetector 14.

As an optional implementation, the vector interference light collection module includes an interference vortex light generating unit and an interference vortex light collection unit.

The interference vortex light generating unit is arranged on the outgoing light path of the vector interference light and is configured to receive the vector interference light and perform the vortex interference on the vector interference light to obtain the interference vortex light.

The interference vortex light collection unit is connected to the interference vortex light generating unit, and is configured to collect the interference vortex light.

As an optional implementation, the interference vortex light generating unit includes a vortex half-wave plate 15 and a Dove prism 16.

The vortex half-wave plate 15 is arranged on the outgoing light path of the vector interference light, and is configured to modulate the vector interference light into vortex light.

The Dove prism 16 is configured to: receive the vortex light, divide the vortex light into a reflected light and a refracted light, totally reflect the refracted light to obtain total reflected light, and perform interfere on the reflected light and the total reflected light to obtain the interference vortex light.

Specifically, one side of the Dove prism 16 (that is, a side opposite to an incident side of the vortex light) is coated with a reflective film, when the vortex light reaches the incident side of the Dove prism 16, the vortex light is reflected and refracted to generate a reflected light and a refracted light. The reflected light is reflected toward exterior of the Dove prism 16, and the refracted light enters the Dove prism 16. Due to an existence of the reflective film, the refracted light will be subjected to multiple total reflections, for example 5 total reflections, inside the Dove prism 16 to obtain the total reflected light. The total reflected light will be re-converged on the incident side of the Dove prism 16, and the total reflected light and the reflected light incident to the incident side occurs interference in a vector vortex light field to obtain the interference vortex light.

As an optional implementation, the vector interference light collection unit includes a CCD camera 18.

The CCD camera 18 is configured to collect the interference vortex light.

Specifically, the CCD camera 18 is configured to collect the images of the interference vortex light before and after movement of the object.

As an optional implementation, the interference vortex light collection unit further includes: a second laser beam expander 17.

The second laser beam expander 17 is arranged on the outgoing light path of the interference vortex light, and is configured to amplify the interference vortex light.

In practical applications, due to small spots of the laser beam emitted by the light source 1, the generated interference vortex light may be small in size and difficult to collect. Through the second laser beam expander 17, the interference vortex light beam can be expanded, so as to be easily collected by the CCD camera 18.

As an optional implementation, the displacement calculation module 19 includes: a first displacement calculation unit 20, a second displacement calculation unit 21 and a third displacement calculation unit 22.

The first displacement calculation unit 20 is connected to the scalar interference light collection module, and is configured to calculate a first displacement of the object being moved according to the scalar interference light.

Specifically, according to the periodic light intensity change curve, a number of cycles of the light intensity change of the object being moved are obtained, and the largest integer number of the cycles is obtained to be multiplied by half of wavelength of the laser beam to obtain the first displacement.

The second displacement calculation unit 21 is connected to the vector interference light collection module, and is configured to calculate a second displacement of the object being moved according to the interference vortex light.

Specifically, according to the images (petal-shaped images) of the interference vortex lights collected by the CCD camera 18 after and before movement of the object, an angle difference of the petal-shaped images after and before the movement of the object are obtained, and the angle difference is multiplied by a half of the wavelength of the laser beam to obtain the second displacement.

The third displacement calculation unit 22 is connected to the first displacement calculation unit 20 and the second displacement calculation unit 21, and the third displacement calculation unit 22 is configured to calculate the displacement of the object according to the first displacement and the second displacement.

Specifically, the displacement of the object is the sum of the first displacement and the second displacement.

In summary, the processes of the system are as follows.

The light source 1 emits laser beam to the polarization beam splitting prism 3 via the third quarter wave plate 2 (or not via the third quarter wave plate 2), the polarization beam splitting prism 3 divides the laser beam into the first transmitted light and the first reflected light.

The first quarter wave plate 4 receives the first transmitted light, changes the phase of the first transmitted light and transmits the first transmitted light after phase change to the object to be measured, receives the first to-be-measured light reflected by the first plane mirror 5, changes the phase of the first to-be-measured light to obtain the second reflected light and transmits the second reflected light to the polarization beam splitting prism 3.

The second quarter wave plate 6 receives the first reflected light, changes the phase and direction of the first reflected light, and transmits the first reflected light after phase change to the second plane mirror 7. Then, the second quarter wave plate 6 change the first reflected light after phase change reflected by the second plane mirror 7 to obtain the second transmitted light, and transmits the second transmitted light to the polarization beam splitting prism 3.

Then, the polarization beam splitting prism 3 converges the second reflected light and the second transmitted light to obtain the first convergent light.

The first right-angle prism 8 receives the first convergent light and reverses the direction of the first convergent light to obtain the first reversed light, and then transmits the first reversed light to the polarization beam splitting prism 3.

The polarization beam splitting prism 3 divides the first reversed light into the third transmitted light and the third reflected light.

The first quarter wave plate 4 receives the third reflected light, changes the phase of the third reflected light, and transmits the third reflected light after phase change to the object. Then, the first quarter wave plate 4 receives the second to-be-measured light reflected by behind the object to obtain the second to-be-measured light reflected by the first plane mirror 5, changes the phase of the second to-be-measured light to obtain the fourth transmitted light, and transmits the fourth transmitted light to the polarization beam splitting prism 3.

The second quarter wave plate 6 also receives the third transmitted light, changes the phase and direction of the third reflected light, and transmits the third transmitted light after phase change to the second plane mirror 7. Then, the second quarter wave plate 6 changes the phase of the third transmitted light after phase change reflected by the second plane mirror 7 to obtain the fourth reflected light, and transmits the fourth reflected light to the polarization beam splitting prism 3.

The polarization beam splitting prism 3 also converges the fourth transmitted light and the fourth reflected light to obtain the second convergent light.

The second right-angle prism 9 reverses the direction of the second convergent light to obtain the second reversed light, and transmits the second reversed light to the polarization beam splitting prism 3.

The polarization beam splitting prism 3 also divides the second reversed light into the fifth transmitted light and the fifth reflected light, transmits the fifth transmitted light to the non-polarization beam splitting prism 12 via the fourth right-angle prism 11 (or not via the fourth right-angle prism 12) and transmits the fifth reflected light to the non-polarization beam splitting prism 12 via the third right-angle prism 10 (or not via the third right-angle prism 10).

The non-polarization beam splitting prism 12 converges the fifth transmitted light and the fifth reflected light to obtain the scalar interference light and the vector interference light.

The photodetector 14 within the scalar interference light collection module collects the images of the scalar interference light via the first laser beam expander 13 (or not via the first laser beam expander 13).

The interference vortex light generating unit receives the vector interference light and performs the vortex interference on the vector interference light to obtain the interference vortex light.

The CCD camera 18 within the interference vortex light collection unit collects the petal-shaped images of the interference vortex light via the second laser beam expander 17 (or not via the second laser beam expander 17).

The first displacement calculation unit 20 calculates the first displacement according to the images of the scalar interference light.

The second displacement calculation unit 21 calculates the second displacement according to the petal-shaped images of the interference vortex light.

The third displacement calculation unit 22 calculates the displacement of the object by summing the first displacement and the second displacement.

And the scalar interference light collected by the photodetector 14 is a scalar signal, the interference vortex light collected by the CCD camera 18 is a vector signal, therefore, the displacement of the object is calculated by combining the scalar signal with the vector signal, to realize rapid collection and demodulation of interference signals while improving the resolution of measuring the displacement.

Each example of the present specification is described in a progressive manner, each example focuses on the difference from other examples, and the same and similar parts between the examples may refer to each other. Since the method disclosed in the embodiments corresponds to the system disclosed in the embodiments, the description is relatively simple, and reference can be made to the system descriptions.

In this specification, several specific embodiments are used for illustration of the principles and implementations of the present disclosure. The description of the foregoing embodiments is used to help illustrate the system and the method of the present disclosure and the core ideas thereof. In addition, those of ordinary skills in the art can make various modifications in terms of specific implementations and the scope of application in accordance with the ideas of the present disclosure. In conclusion, the content of this specification shall not be construed as a limitation to the present disclosure.

What is claimed is:

1. A composite measurement system for measuring nanometer displacement, comprising:
   a light source, a polarization beam splitting prism, a first phase change module, a second phase change module, a first right-angle prism, a second right-angle prism, a non-polarization beam splitting prism, a scalar interference light collection module, a vector interference light collection module and a computer;
   the light source is configured to emit laser beam;
   the polarization beam splitting prism is arranged on an outgoing light path of the laser beam, and is configured to divide the laser beam into a first transmitted light and a first reflected light;
   the first phase change module is arranged on an outgoing light path of the first transmitted light, a target object is arranged in the first phase change module, and the first phase change module is configured to: change a phase of the first transmitted light, transmit the first transmitted light after phase change to the target object, receive a first to-be-measured light reflected by the target object, change a phase of the first to-be-measured light to obtain a second reflected light, and transmit the second reflected light to the polarization beam splitting prism;
   the second phase change module is arranged on an outgoing light path of the first reflected light, and is configured to: change a phase and direction of the first reflected light to obtain a second transmitted light, and transmit the second transmitted light to the polarization beam splitting prism;
   the polarization beam splitting prism is also configured to converge the second reflected light and the second transmitted light to obtain a first convergent light;
   the first right-angle prism is arranged on an outgoing light path of the first convergent light, and is configured to reverse a direction of the first convergent light to obtain a first reversed light;
   the polarization beam splitting prism is also configured to divide the first reversed light into a third transmitted light and a third reflected light;
   the first phase change module is also configured to: change a phase of the third reflected light, transmit the third reflected light after phase change to the target object, receive a second to-be-measured light reflected by the target object, change a phase of the second to-be-measured light to obtain a fourth transmitted light, and transmit the fourth transmitted light to the polarization beam splitting prism;
   the second phase change module is also configured to: change a phase and a direction of the third transmitted light to obtain a fourth reflected light, and transmit the fourth reflected light to the polarization beam splitting prism;
   the polarization beam splitting prism is also configured to converge the fourth transmitted light and the fourth reflected light to obtain a second convergent light;
   the second right-angle prism is arranged on an outgoing light path of the second convergent light, and is configured to reverse a direction of the second convergent light to obtain a second reversed light;
   the polarization beam splitting prism is also configured to divide the second reversed light into a fifth transmitted light and a fifth reflected light;
   the non-polarization beam splitting prism is configured to converge the fifth transmitted light and the fifth reflected light to obtain a scalar interference light and a vector interference light;
   the scalar interference light collection module is arranged on an outgoing light path of the scalar interference light, and is configured to collect the scalar interference light;
   the vector interference light collection module is arranged on an outgoing light path of the vector interference light, and is configured to: collect the vector interference light, perform a vortex interference on the vector interference light to obtain an interference vortex light, and collect the interference vortex light; and
   the computer is connected to the scalar interference light collection module and the vector interference light collection module respectively, and the computer is configured to calculate a displacement of the target object being moved according to the scalar interference light and the interference vortex light.

2. The composite measurement system for measuring nanometer displacement according to claim 1, wherein the composite measurement system further comprises:
   a third right-angle prism;

the third right-angle prism is arranged on an outgoing light path of the fifth reflected light, and is configured to change a direction of the fifth reflected light and transmit the fifth reflected light after direction change to the non-polarization beam splitting prism.

3. The composite measurement system for measuring nanometer displacement according to claim 2, wherein the composite measurement system further comprises a fourth right-angle prism;
the fourth right-angle prism is arranged on an outgoing light path of the fifth transmitted light, and is configured to change a direction of the fifth transmitted light and transmit the fifth reflected light after a direction change to the non-polarization beam splitting prism.

4. The composite measurement system for measuring nanometer displacement according to claim 1, wherein the first phase change module comprises a first quarter wave plate;
the first quarter wave plate is arranged on the outgoing light path of the first transmitted light, and is located between the polarization beam splitting prism and the target object; and
the first quarter wave plate is configured to change a phase of a light passing through the first quarter wave plate.

5. The composite measurement system for measuring nanometer displacement according to claim 1, wherein the first phase change module further comprises a first plane mirror;
the first plane mirror is arranged on an outgoing light path of the light after phase change, and is located on surface of the target object; and
the first plane mirror is configured to reflect the light after phase change which has arrived at the first plane mirror, to a first quarter wave plate.

6. The composite measurement system for measuring nanometer displacement according to claim 1, wherein the second phase change module comprises a second quarter wave plate and a second plane mirror;
the second quarter wave plate and the second plane mirror are arranged on the outgoing light path of the first reflected light, and the second quarter wave plate is located between the polarization beam splitting prism and the second plane mirror;
the second quarter wave plate is configured to change a phase of a light passing through the second quarter wave plate; and
the second plane mirror is configured to reflect the light after phase change which has arrived at the second plane mirror, to the second quarter wave plate.

7. The composite measurement system for measuring nanometer displacement according to claim 1, wherein the composite measurement system further comprises a third quarter wave plate;
the third quarter wave plate is arranged on the outgoing light path of the laser beam, and is located between the light source and the polarization beam splitting prism; and
the third quarter wave plate is configured to translate the laser beam into a circular polarized light, and transmit the circular polarized light to the polarization beam splitting prism.

8. The composite measurement system for measuring nanometer displacement according to claim 1, wherein the scalar interference light collection module comprises a photodetector;
the photodetector is arranged on the outgoing light path of the scalar interference light, and is configured to collect the scalar interference light.

9. The composite measurement system for measuring nanometer displacement according to claim 8, wherein the scalar interference light collection module further comprises a first laser beam expander;
the first laser beam expander is arranged on the outgoing light path of the scalar interference light, and is located between the photodetector and the non-polarization beam splitting prism; and
the first laser beam expander is configured to amplify the scalar interference light, and transmit the scalar interference light amplified to the photodetector.

10. The composite measurement system for measuring nanometer displacement according to claim 1, wherein the vector interference light collection module comprises an interference vortex light generating unit and an interference vortex light collection unit;
the interference vortex light generating unit is arranged on the outgoing light path of the vector interference light and is configured to receive the vector interference light and perform the vortex interference on the vector interference light to obtain the interference vortex light; and
the interference vortex light collection unit is connected to the interference vortex light generating unit, and is configured to collect the interference vortex light.

11. The composite measurement system for measuring nanometer displacement according to claim 10, wherein the interference vortex light generating unit comprises a vortex half-wave plate and a Dove prism;
the vortex half-wave plate is arranged on the outgoing light path of the vector interference light, and is configured to modulate the vector interference light into vortex light; and
the Dove prism is configured to: receive the vortex light, divide the vortex light into a reflected light and a refracted light, totally reflect the refracted light to obtain total reflected light, and perform interfere on the reflected light and the total reflected light to obtain the interference vortex light.

12. The composite measurement system for measuring nanometer displacement according to claim 10, wherein the vector interference light collection unit comprises a CCD camera;
the CCD camera is configured to collect the interference vortex light.

13. The composite measurement system for measuring nanometer displacement according to claim 12, wherein the interference vortex light collection unit further comprises a second laser beam expander;
the second laser beam expander is arranged on the outgoing light path of the interference vortex light, and is configured to amplify the interference vortex light.

14. The composite measurement system for measuring nanometer displacement according to claim 1, wherein the computer comprises: a first displacement calculation unit, a second displacement calculation unit and a third displacement calculation unit which are implemented by computer programs;
the first displacement calculation unit is communicatively coupled to the scalar interference light collection module, and is configured to calculate a first displacement of the target object being moved according to the scalar interference light;

the second displacement calculation unit is communicatively coupled to the vector interference light collection module, and is configured to calculate a second displacement of the target object being moved according to the interference vortex light; and the third displacement calculation unit is communicatively coupled to the first displacement calculation unit and the second displacement calculation unit, and the third displacement calculation unit is configured to calculate the displacement of the target object according to the first displacement and the second displacement.

15. A composite measurement system for measuring nanometer displacement, comprising:

a light source, a polarization beam splitting prism, a first phase change module, a second phase change module, a first right-angle prism, a second right-angle prism, a non-polarization beam splitting prism, a scalar interference light collection module and a vector interference light collection module;

the light source is configured to emit laser beam;

the polarization beam splitting prism is arranged on an outgoing light path of the laser beam, and is configured to divide the laser beam into a first transmitted light and a first reflected light;

the first phase change module is arranged on an outgoing light path of the first transmitted light, a target object is arranged in the first phase change module, and the first phase change module is configured to: change a phase of the first transmitted light, transmit the first transmitted light after phase change to the target object, receive a first to-be-measured light reflected by the target object, change a phase of the first to-be-measured light to obtain a second reflected light, and transmit the second reflected light to the polarization beam splitting prism;

the second phase change module is arranged on an outgoing light path of the first reflected light, and is configured to: change a phase and direction of the first reflected light to obtain a second transmitted light, and transmit the second transmitted light to the polarization beam splitting prism;

the polarization beam splitting prism is also configured to converge the second reflected light and the second transmitted light to obtain a first convergent light;

the first right-angle prism is arranged on an outgoing light path of the first convergent light, and is configured to reverse a direction of the first convergent light to obtain a first reversed light;

the polarization beam splitting prism is also configured to divide the first reversed light into a third transmitted light and a third reflected light;

the first phase change module is also configured to: change a phase of the third reflected light, transmit the third reflected light after phase change to the target object, receive a second to-be-measured light reflected by the target object, change a phase of the second to-be-measured light to obtain a fourth transmitted light, and transmit the fourth transmitted light to the polarization beam splitting prism;

the second phase change module is also configured to: change a phase and a direction of the third transmitted light to obtain a fourth reflected light, and transmit the fourth reflected light to the polarization beam splitting prism;

the polarization beam splitting prism is also configured to converge the fourth transmitted light and the fourth reflected light to obtain a second convergent light;

the second right-angle prism is arranged on an outgoing light path of the second convergent light, and is configured to reverse a direction of the second convergent light to obtain a second reversed light;

the polarization beam splitting prism is also configured to divide the second reversed light into a fifth transmitted light and a fifth reflected light;

the non-polarization beam splitting prism is configured to converge the fifth transmitted light and the fifth reflected light to obtain a scalar interference light and a vector interference light;

the scalar interference light collection module is arranged on an outgoing light path of the scalar interference light, and is configured to collect the scalar interference light;

the vector interference light collection module is arranged on an outgoing light path of the vector interference light, and is configured to: collect the vector interference light, perform a vortex interference on the vector interference light to obtain an interference vortex light, and collect the interference vortex light; and wherein a displacement of the target object being moved is determined according to the scalar interference light and the interference vortex light.

* * * * *